United States Patent

Srivastava

[15] 3,637,922

[45] Jan. 25, 1972

[54] VARIABLE PHASE SHIFT CIRCUIT AND METHOD

[72] Inventor: Gopal Krishna Srivastava, Batavia, N.Y.

[73] Assignee: Sylvania Electric Products Inc.

[22] Filed: July 23, 1970

[21] Appl. No.: 57,436

Related U.S. Application Data

[63] Continuation of Ser. No. 25,215, Apr. 2, 1970, abandoned.

[52] U.S. Cl. ....................................... 178/5.4 HE, 307/262
[51] Int. Cl. ....................................... H04n 9/12
[58] Field of Search ....................178/5.4 R, 5.4 HE; 307/262

[56] References Cited

UNITED STATES PATENTS 3,260,965 7/1966 Schmal ............................307/262 X
3,274,334 9/1966 Hansen et al. ....................178/5.4 HE

*Primary Examiner*—Robert L. Richardson
*Attorney*—Norman J. O'Malley, Robert E. Walrath and Thomas H. Buffton

[57] ABSTRACT

A variable phase shift circuit and method is disclosed wherein a transistor is biased at a sufficiently low level such that the transistor exhibits a substantial capacitive coupling between the base and collector whereby the output signal taken from the collector is of a phase, with respect to the input signal applied at the base, substantially less than 180°. The phase shift is varied by varying the potential difference between the collector and base thereby varying the reactive coupling between the base and collector.

18 Claims, 9 Drawing Figures

INVENTOR.
GOPAL K. SRIVASTAVA
BY
Robert E. Walrath
ATTORNEY

INVENTOR.
GOPAL K. SRIVASTAVA
BY
Robert E. Walrath
ATTORNEY

VARIABLE PHASE SHIFT CIRCUIT AND METHOD

CROSS-REFERENCE TO RELATED APPLICATION

This application is a continuing application which discloses and claims the subject matter of a copending application, now abandoned, of Gopal Krishna Srivastava entitled "Variable Phase Shift Circuit and Method," Ser. No. 25,215, filed Apr. 2, 1970, and assigned to the same assignee as the present invention.

BACKGROUND OF THE INVENTION

This invention pertains to phase shift circuitry and more particularly to phase shift circuitry wherein the magnitude of the phase shift can be varied. Phase shift devices and circuits find numerous applications, one of which is to vary the hue or tint of the displayed picture of a color television receiver. In a color television signal the chrominance signal contains color saturation information which is transmitted as amplitude modulations, and hue or tint information which is transmitted as phase modulations. A reference phase is transmitted as the color burst signal which, when separated from the composite video signal, is used to synchronize a reference oscillator. The reference oscillator output signal is used to synchronously demodulate the chrominance signal.

The operator can vary the tint of the displayed picture by varying the relative phase of the chrominance signal with respect to the phase of the reference signal. The relative phase of the chrominance signal and the reference signal can be varied in numerous ways some of which are by varying the phase of the chrominance signal after the color burst signal takeoff, by varying the phase of the color burst signal thereby varying the phase of the reference signal, or by varying the phase of the reference signal. Most prior art color television receivers contain a variable component, such as a potentiometer, to vary the tint. This variable component is ordinarily included in a passive phase shift network.

Most prior art remotely controlled color television receivers utilize a remotely controlled motor to drive the variable component in the phase shift network. Such systems are expensive, however, and they are also unreliable because of mechanical wear of moving parts. One attempt to circumvent the mechanical portions of prior art remote controls resulted in a system wherein two reference signals 180° out of phase were added with the phase of the resulting signal being controlled by varying the amplitude of one of the reference signals in response to a remotely generated signal. This system suffers from the disadvantages of high cost and large number of components required among others.

OBJECTS AND SUMMARY OF THE INVENTION

Accordingly, it is a primary object of this invention to provide a variable phase shift circuit and method which obviates the disadvantages of the prior art.

It is a further object of this invention to provide a variable phase shift circuit and method wherein the phase shift is controlled by a variable voltage.

It is a further object of this invention to provide improved tint control in color television receivers.

It is a further object of this invention to provide improved remotely controlled tint control in color television receivers.

It is a further object of this invention to control the phase of a signal by controlling the bias of a transistor.

It is a further object of this invention to control the phase of a signal by controlling the reactive coupling between electrodes of a transistor.

In one aspect of this invention the above objects are achieved in a variable phase shift circuit in which a transistor is biased to exhibit a substantial reactive coupling between the base and the collector. The magnitude of the reactive coupling is varied by varying the potential difference between the base and collector electrodes thereby varying the phase of a signal received at the collector electrode with respect to a signal applied at the base electrode. The phase shift is thus controlled by varying the magnitude of the potential difference between the base and collector electrodes.

In a more limited aspect of this invention, the above objects are achieved in a remotely controlled tint control system wherein the magnitude of the phase shift is controlled by a control voltage derived from a remotely transmitted signal. The control voltage is utilized to vary the potential difference between the base and collector of the phase control transistor thereby controlling the magnitude of the phase shift.

DETAILED DESCRIPTION OF THE INVENTION

For a better understanding of the present invention, together with other and further objects, advantages, and capabilities thereof, reference is made to the following disclosure and appended claims in connection with the above-described drawings.

Figure 1:
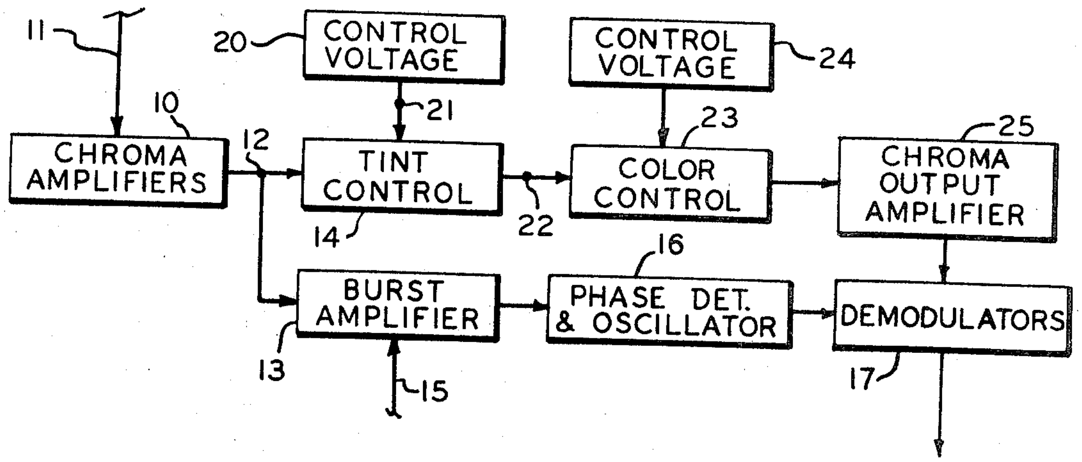
FIG. 1 is a block diagram of a portion of the chroma section of a color television receiver.

In FIG. 1 the composite video signal from the video section of the color television receiver is applied to chroma amplifiers 10 via a lead 11. The output of chroma amplifiers 10 is connected to a junction point 12 which is further connected to a burst amplifier 13 and a tint or hue control 14. Junction point 12 is the burst takeoff point where the color burst signal is applied to burst amplifier 13. Gating pulses are applied to burst amplifier 13 via lead 15 in the usual manner. The color burst signal from burst amplifier 13 is connected to a phase detector and reference oscillator 16 wherein the reference oscillator is phase locked to the color burst signal. The reference signal output of the oscillator is connected to demodulators 17 which include, for example, "X" and "Z" synchronous demodulators.

A control voltage source 20 is connected to a terminal 21 which is further connected to tint control 14. An output of tint control 14 is connected to a terminal 22 which is further connected to a color control 23 which also receives an output of control voltage source 24. An output of color control 23 is connected to a chroma output amplifier 25 which has an output connected to demodulators 17. Demodulators 17 demodulate the chrominance signal to provide R–Y and B–Y color difference signals which are additionally processed, for example, in color difference amplifiers before application to a cathode-ray tube. Other control circuitry in the chroma section has been omitted from FIG. 1 because it is unnecessary for an understanding of the invention.

The composite video signal is processed by chroma amplifiers 10 and chroma output amplifier 25 so that demodulators 17 provide suitable demodulated color difference signals. The composite video signal after it enters the chroma section is ordinarily processed by suppressing the synchronizing signals and luminance signal with the resulting signal being defined as the chrominance signal. The amplitude of the chrominance signal determines the color saturation of the displayed picture. Color control 23 provides amplitude control, and hence, color saturation control which will be described more fully hereinafter. The phase of the chrominance signal with respect to the phase of the reference signal determines the tint or hue of the displayed picture. The relative phase of the chrominance and reference signals can be varied by a phase shift device or circuit inserted at several places including, for example, between the burst takeoff point (junction 12) and burst amplifier 13, between the reference oscillator and demodulators 17, or in the chrominance signal channel between the burst takeoff point and demodulators 17. The invention will be described with respect to the latter alternative, but those skilled in the art will realize that tint control 14 can be moved to various points in FIG. 1 to provide any of the various alternatives.

Figure 2:
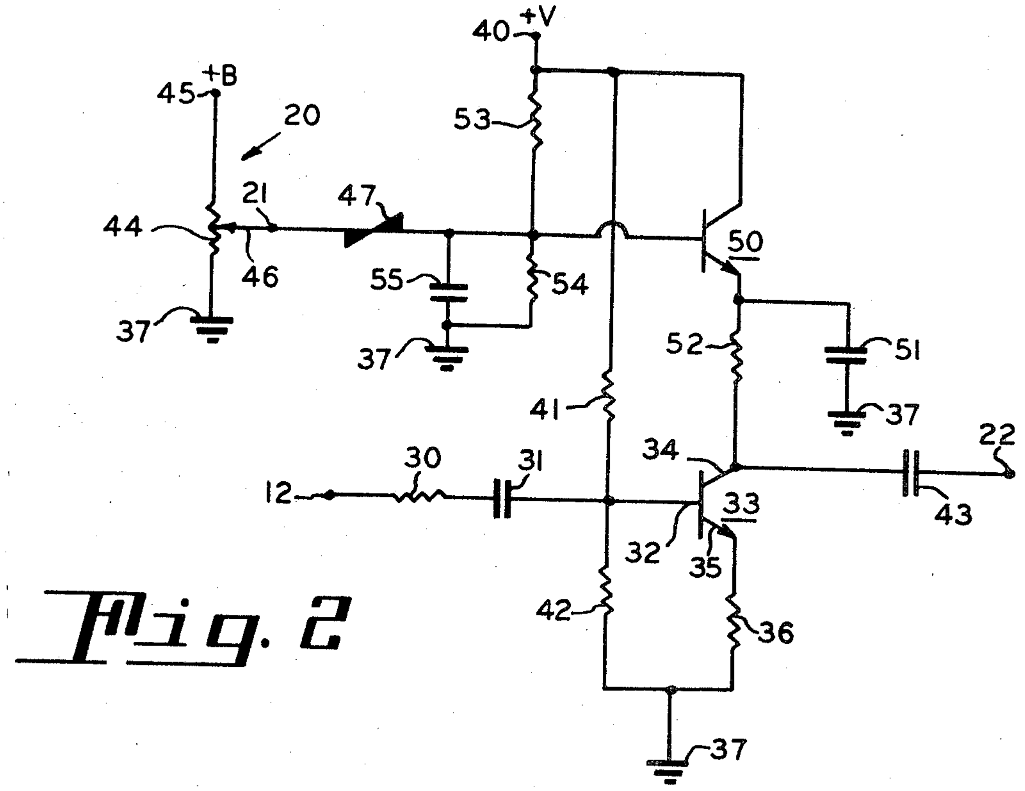
FIG. 2 is a schematic diagram of one embodiment of the invention.

FIG. 2 illustrates one embodiment of a tint control circuit in accordance with the invention. Junction 12 is connected by a resistor 30 in series with a coupling capacitor 31 to a base electrode 32 of a transistor means or phase shift transistor 33 which further has a collector electrode 34 and an emitter electrode 35. Emitter 35 is connected by a resistor 36 to a common conductor illustrated as ground 37. A potential source illustrated as a terminal 40 is connected by a resistor 41 to base 32 which is further connected by a resistor 42 to ground 37. Collector 34 is connected by a coupling capacitor 43 to terminal 22.

Control voltage source 20 is illustrated as a potentiometer resistance element 44 connected between a potential source illustrated as a terminal 45 and ground 37 together with a wiper 46 connected to terminal 21. Terminal 21 is further connected to a nonlinear impedance element illustrated as a voltage-dependent resistance (VDR) 47, the other end of which is connected to a control or base electrode of a transistor means 50. Transistor 50 further has a collector electrode connected to terminal 40 and an output or emitter electrode connected to ground 37 by means of a capacitor 51 and connected to collector 34 of transistor 33 by means of a resistor 52. The base of transistor 50 is connected by a resistor 53 to terminal 40 and by a parallel combination of a resistor 54 and a capacitor 55 to ground 37.

Transistor 33 is biased at a low level, that is, the bias voltage levels at base 32 and collector 34 are such that transistor 33 exhibits substantial reactive or capacitive coupling between base 32 and collector 34. When a transistor is biased at ordinary voltage and current levels, there is little signal coupling between the base and collector. Thus, the signal at the collector is almost 180° out of phase from the signal at the emitter and at the base. For most purposes those skilled in the art consider the collector signal as being 180° out of phase with the base signal. As the potential difference between the base and collector decreases, the reactive or capacitive coupling effect between the base and collector becomes larger and the phase shift between the base and collector becomes less than 180°. The capacitive coupling continuously increases until the transistor becomes inoperative due to forward biasing of the base-collector junction; thus, the phase shift between the base and collector also continuously varies from 180°. The phase shift between the base and collector is generally close to 180°, however, until the potential difference between the collector and base drops to a low voltage, for example, on the order of 2–3 volts depending on the transistor type. By varying the potential difference between the base and collector, the magnitude of the reactive coupling between the base and collector can be varied thereby varying the phase shift through the tint control circuit.

Clearly, therefore, for a transistor to be operated as a variable phase shift device in accordance with this invention, it must be biased at a low level where it exhibits substantial reactive coupling between the base and collector. As an example only, collector to base potentials from approximately 0 volts to approximately 1 volt were used in one embodiment of this invention to obtain a phase shift range of approximately 150°. Larger collector-base potentials result in the phase shift approaching 180°. The full range of phase shift may not be usable in all cases, however, due to signal distortion which may occur especially as the collector-base potential approaches 0 volts.

Referring again to FIG. 2, the chrominance signal at junction 12 is applied to base 32. Transistor 33 phase shifts the signal and the phase shifted signal is provided to terminal 22 by collector 34. The bias of base 32 is determined by resistors 41 and 42 while the collector bias is determined by resistor 52 and transistor 50. The bias of transistor 50 is determined by resistors 53 and 54 together with the control voltage provided at terminal 21. When wiper 46 is near the positive end of resistance element 44, a larger control voltage is coupled to the base of transistor 50. Transistor 50 operates as an emitter follower so that its emitter voltage rises with its base voltage. The increase in emitter voltage of transistor 50 causes the voltage of collector 34 to rise thereby causing the phase shift from base 33 to collector 34 to increase toward 180°. Similarly, a decreasing control voltage at terminal 21 causes the voltage of collector 34 to decrease thereby decreasing the phase shift toward 0°. At very low collector-to-base potentials, the phase shift will become negative as will become evident from the explanation of FIGS. 4 and 5.

Transistor 50 provides temperature compensation for transistor 33 to compensate for leakage currents in transistor 33 as well as a means for varying the bias of collector 34. Without transistor 50 a larger collector resistance would be required to permit adequate control of the voltage at collector 34.

Figure 3A:
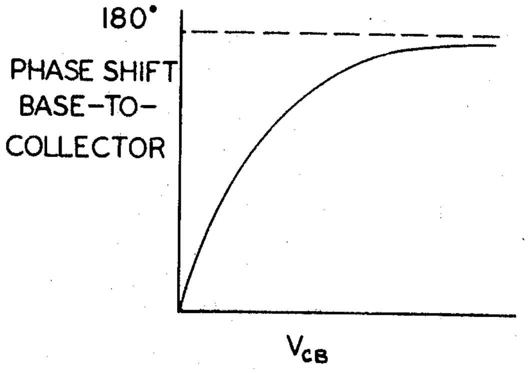
FIGS. 3A and 3B are simplified graphs to aid in explaining FIG. 2.
Figure 3B:
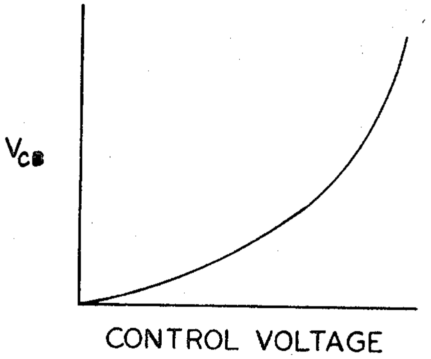

FIG. 3A shows a simplified graph of the base-to-collector phase shift plotted as a function of the collector-to-base potential of transistor 33. The phase shift is not linear with voltage, thus when the invention is used as a tint control, the change in tint with respect to a variation in control voltage would not be linear. VDR 47 is used to provide a more linear change in phase shift or tint with changes in control voltage. FIG. 3B is a simplified graph of the collector-to-base voltage of transistor 33 as a function of the control voltage at terminal 21 due to the action of VDR 47. At low control voltages there would normally be a rapid change in phase shift with changes in collector voltages, but VDR 47 causes a slower change in collector voltage with changes in control voltage thereby tending to linearize the operation of the invention.

Figure 4:
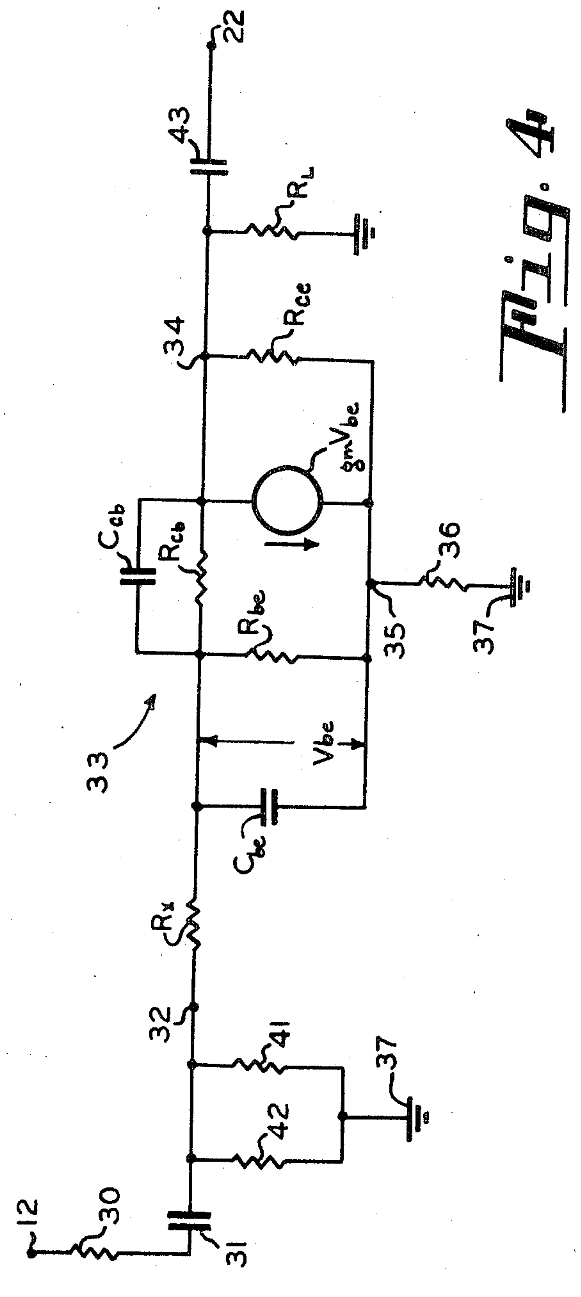
FIG. 4 is an equivalent circuit of a portion of FIG. 2.

FIG. 4 illustrates a portion of FIG. 2 with a hybrid—$\pi$ small signal equivalent circuit substituted for transistor 33. This equivalent circuit is developed and explained in C. L. Searle, et al. *SEEC NOTES I—ECP:Elementary Circuit Properties of Transistors*, Wiley & Sons, 1962. It is used herein solely to aid in more fully explaining how the invention is believed to operate. In general, the small signal equivalent circuit is the same whether transistor 33 is an NPN transistor as shown or a PNP transistor. In the discussion of FIG. 4, capacitors 31 and 43 can be ignored because they are large coupling capacitors. Base bias resistors 41 and 42 are shown connected in parallel because in small signal analysis potential sources are considered shorted. $R_L$ is the resistance between collector 34 and ground which is primarily due to resistor 52. $R_x$ is the series base resistance which is usually very small. $C_{be}$ and $R_{be}$ are the base-to-emitter resistance and capacitance while $R_{ce}$ is the collector-to-emitter resistance. $C_{cb}$ and $R_{cb}$ are the collector-to-base resistance and capacitance. The current source $gmV_{be}$ illustrates the 180° phase shift from emitter to collector. In a typical transistor biased at typical operating conditions $C_{cb}$ is very small and $R_{cb}$ is very large; thus, these components are usually negligible. As the collector-to-base potential decreases, however, $C_{cb}$ increases and $R_{cb}$ decreases so that at low collector bias conditions the collector-base coupling is no longer negligible.

Assume low level bias conditions of a typical transistor such that the collector voltage is, for example, 2.6 volts and the base voltage is, for example, 1.75 volts. The potential difference between the base and collector is then 0.85 volts. The resistance between base 32 and ground 37 is the parallel combination of resistors 41 and 42 in parallel with the input resistance of the transistor. The input resistance of the transistor $R_{in}$, is approximately $h_{fe}$ times the resistance of resistor 36, $R_{36}$, where $h_{fe}$ is the forward current gain of the transistor in a common emitter configuration. Since $h_{fe}R_{36}$ is much larger than $R_{be}$ and $R_x$, $R_{be}$ and $R_x$ are considered negligible. The input capacitance at the base, $C_{in}$, is approximately equal to $C_{cb}$ (1+A), where A is approximately equal to $R_L/R_{36}$. Since $R_L$ is much smaller than $R_{36}$, $C_{in}$ is approximately equal to $C_{cb}$. Note that $C_{be}$ can be ignored because $R_{36}$ is in series with $C_{be}$ to ground and the reactance of $C_{cb}$ is much smaller than $R_{36}$.

Figures 5A, 5B, 7:
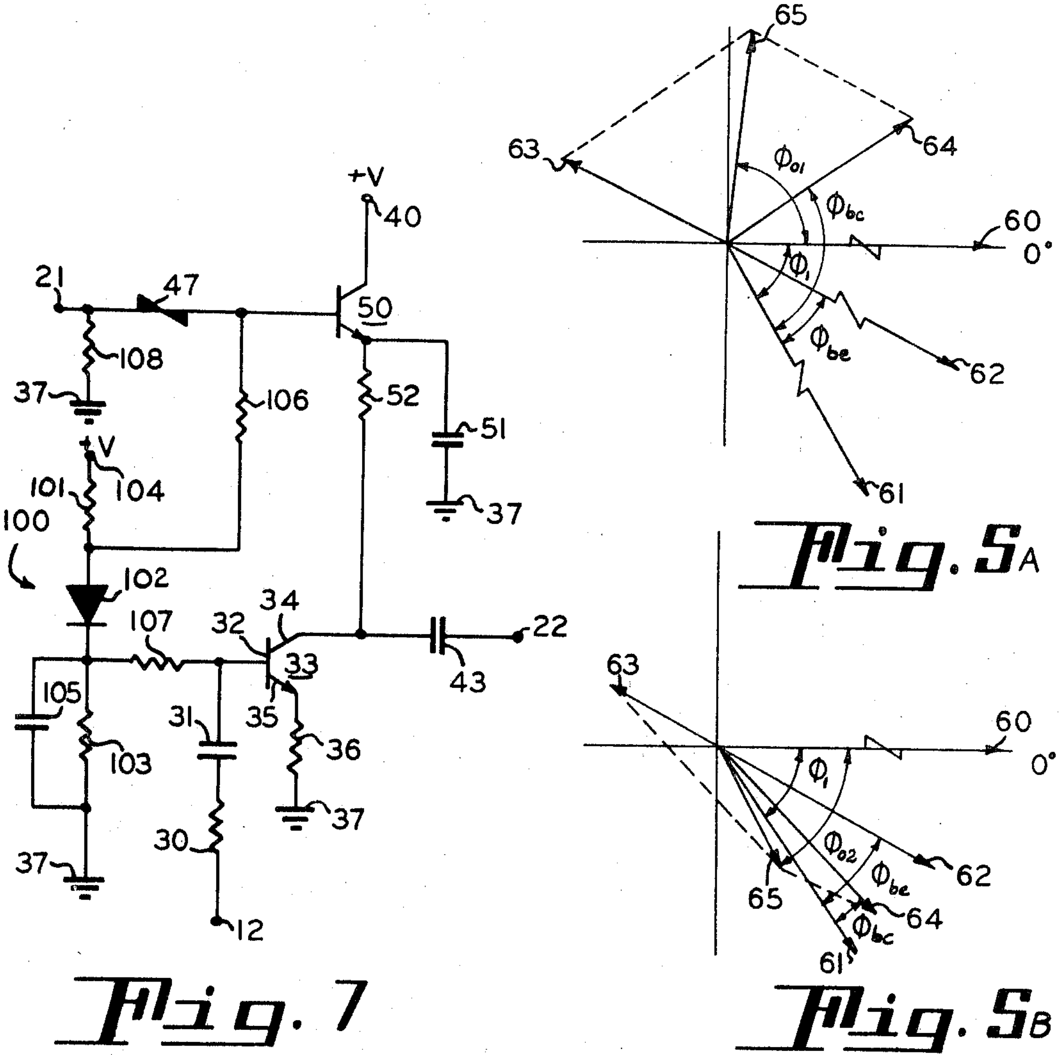
FIGS. 5A and 5B are phasor diagrams to aid in explaining FIG. 4.
FIG. 7 is a schematic diagram of another embodiment of the invention.

FIG. 5A is a phasor diagram for explaining the operation of FIG. 4 in the above example. Assume that the input signal at terminal 12 is represented by vector 60 which has a 0° phase. Vector 61 then represents the base signal at base 32 which is at a negative angle $\phi_1$ with respect to the input voltage due to the input impedance $Z_{in}=R_{in}+X_{in}$. In equations $\phi_1$=tan $(X_{in}/R_{in})$ where $X_{in}=1/WC_{in}$. Vector 62 represents the signal at emitter 35 which is of an amplitude approximately equal to the base signal, but of a phase $\phi_{be}$ with respect to the base signal due to the reactance of capacitance $C_{be}$. $\phi_{be}$ may be, for example, approximately 18° in a typical transistor. Vector 63 represents the collector signal due to coupling from emitter 35 to collector 34. This emitter-collector coupling is represented by current source $gmV_{be}$. The collector signal due to emitter-collector coupling is always 180° out of phase with the emitter signal. Vector 64 represents the coupling between base 32 and collector 34 due to $C_{cb}$ and $R_{cb}$. The phase $\phi_{bc}$ between vectors 64 and 61 due to $C_{cb}$ and resistor 52 is generally less than 90° but approaches 90° as the collector voltage increases. The collector signal is represented by vector 65 which is the vector sum of vectors 63 and 64 and is at an angle $\phi_{01}$ with respect to vector 60. As the collector voltage increases, $C_{cb}$ decreases and the amplitude of vector 64 decreases. Hence, as the collector voltage increases (thereby increasing the potential difference between the collector and base), vector 65 rotates toward vector 63 thereby shifting the phase of the collector signal toward 180° with respect to the input signal. Note that at much higher collector voltages the above analysis will not be correct because $C_{cb}$ becomes negligible and the assumptions made to derive the equations for $\phi_1$ and $C_{in}$ will no longer be correct. In general $\phi_1$ and $\phi_{be}$ will become nearly equal so that vector 62 will be of approximately the same phase as vector 60 and vector 63 will be 180° with respect to vector 60 at typical higher collector voltages.

As the control voltage decreases, the collector voltage will also decrease thereby causing the potential difference between the base and collector to approach zero. As the collector voltage decreases $X_{in}$ and $R_{in}$ both decrease in amplitude and because of resistor 30 the base and emitter signal voltages decrease in amplitude. This decrease is illustrated in FIG. 5B wherein vectors 61 and 62 are of a much lesser amplitude. Since $R_{in}$ and $X_{in}$ decrease in approximately the same proportion, $\phi_1$ will be relatively constant. $\phi_{be}$ will also be relatively constant. $R_{in}$ decreases because $h_{fe}$ decreases with decreasing collector voltage. $X_{in}$ decreases because $C_{cb}$ increases with decreasing collector voltage. Decreasing collector voltage causes $gm$ to decrease. Thus, vector 63 representing the collector signal due to current source $gmV_{be}$ decreases although it remains 180° with respect to vector 62. Vector 64 rotates toward vector 61 (base signal) because $\phi_{bc}$ decreases, because $C_{cb}$ becomes larger and $R_{cb}$ becomes smaller. Thus, the resultant vector 65 representing the collector signal has phase $\phi_{02}$ with respect to the input signal. $\phi_{01}+\phi_{02}$ represents the total phase shift variation between the two examples. It should be noted that FIGS. 5A and 5B are not necessarily drawn to scale since they are for the purpose of illustrating the principles of the invention.

As was noted above, the color saturation is controlled by varying the amplitude of the chrominance signal. Thus, the tint control should not change the amplitude of the chrominance signal when the phase is varied. It has been found that the embodiment of the invention described above provides relatively constant gain so that changes in tint produce a minimal effect on color saturation. This is accomplished due to change in amplitude of the signal at the base 32 of the transistor 33, with the change in collector voltage.

Figure 6:
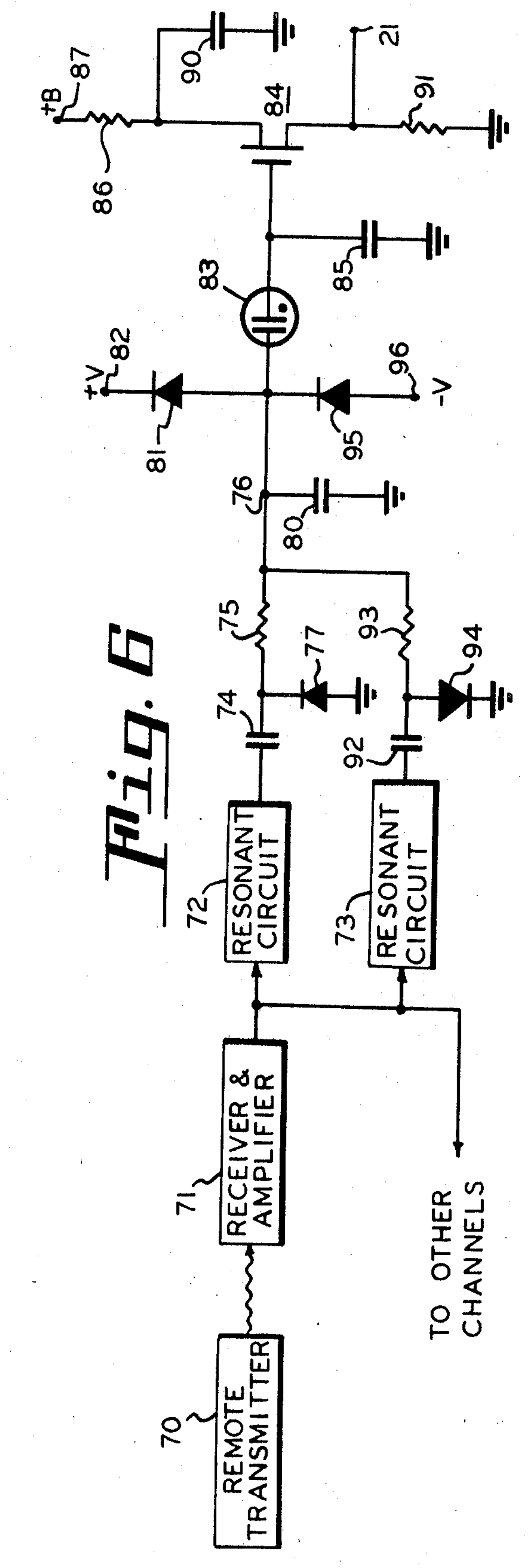
FIG. 6 is a block and schematic diagram of a remote control system for use with the circuit of FIG. 2.

This invention is particularly useful in a remotely controlled tint control system wherein motors and mechanically variable components are not used. One example of a remote control system which can be used to provide a variable control voltage is illustrated in FIG. 6. A remote transmitter 70 radiates a signal which is received and amplified in block 71 which has an output connected to a plurality of resonant circuits, two of which are illustrated by blocks 72 and 73. Resonant circuits 72 and 73 provide sinusoidal output signals when they are activated by a signal from transmitter 70 at the resonant frequency of the particular resonant circuit. The output from resonant circuit 72 is connected by a capacitor 74 in series with a resistor 75 to a junction 76. The junction between capacitor 74 and resistor 75 is connected to the cathode of a diode 77, the anode of which is grounded. When resonant circuit 72 resonates, diode 77, capacitor 74, and resistor 75 rectify and filter the sinusoidal output signal to provide a positive direct voltage at junction 76 which causes a capacitor 80 connected between junction 76 and ground to charge. Junction 76 is connected to the anode of a diode 81, the cathode of which is connected to a positive potential source represented by terminal 82. Diode 81 limits the positive potential at terminal 76.

Junction 76 is further connected to one side of a neon bulb 83, the other side of which is connected to a gate electrode of an insulated gate field effect transistor (FET) 84. The gate of FET 84 is further connected by a capacitive means such as capacitor 85 to ground. The drain electrode of FET 84 is connected by a resistor 86 to a source of positive potential represented by terminal 87 and by a capacitor 90 to ground. The output or source electrode of FET 84 is connected by a resistor 91 to ground and is further connected to terminal 21 in lieu of wiper 46 as was shown in FIG. 2.

When the voltage at terminal 76 becomes sufficiently positive to fire neon bulb 83, capacitor 85 charges to establish a bias potential at the gate of FET 84. The gate bias causes FET 84 to conduct more current thereby raising the potential at terminal 21. Since neon bulb 83 and the gate of FET 84 both present a very high impedance to the charge on capacitor 85, the voltage across capacitor 85 will remain relatively constant for long periods of time. Thus, FET 84 will provide a relatively constant control voltage at terminal 21.

The output of resonant circuit 73 is connected by a capacitor 92 in series with a resistor 93 to junction 76. The junction between capacitor 92 and resistor 93 is connected to the anode of a diode 94, the cathode of which is grounded. When transmitter 70 provides a signal at the resonant frequency of resonant circuit 73, the sinusoidal output signal is rectified and filtered by diode 94, capacitor 92, and resistor 93 to provide a negative direct voltage at junction 76. Junction 76 is connected to the cathode of a diode 95, the anode of which is connected to a negative potential source represented by a terminal 96 to limit the negative voltage at the terminal 76. The negative voltage at terminal 76 causes neon bulb 83 to fire. Capacitor 85 charges in a negative direction to decrease the voltage at the gate of FET 84 and hence decrease the control voltage at terminal 21.

A control module similar to the one shown in FIG. 6 can be used as control voltage source 24 of FIG. 1 to provide a control voltage for color saturation control. Color control 23 can be, for example, a variable gain amplifier wherein the chrominance signal amplitude is varied by varying the gain of the amplifier in response to the control voltage.

FIG. 7 illustrates another embodiment of the invention which utilizes a modified DC bias network for transistors 33 and 50. The modified bias network permits the use of higher tolerance, and hence, less costly resistors.

In FIG. 7 components with the same function as components in FIG. 2 are numbered the same. Capacitor 55 and resistors 41, 42, 53, and 54 are removed and a bias network or circuit 100 is substituted. Bias circuit 100 includes a resistor 101, a diode 102, and a resistor 103 connected in series between a positive potential source illustrated as a terminal 104 (which may be the same as terminal 40) and ground 37. Resistors 101 and 103 and diode 102 operate as a voltage divider network or circuit. A capacitor 105 is connected in parallel with resistor 103. A resistance means, such as a resistor 106, is connected between the junction of resistor 101 with diode 102 and the base of transistor 50. A resistance means, such as a resistor 107, is connected between the junction of diode 102 with resistor 103 and base 32 of transistor 33. Also, a resistor 108 is connected between terminal 21 and ground 37.

The operation of the circuit of FIG. 7 is the same as the operation of the circuit of FIG. 2. Also, the small signal analysis is equally applicable to the circuit of FIG. 7. The bias network 100 provides an input impedance for transistor 33 equivalent to resistors 41 and 42 of FIG. 4. Preferably the resistance of resistor 106 is larger than the resistance of resistor 103 to minimize the change in bias voltage at base 32 of transistor 33 due to control voltage changes at terminal 21. Diode 102 provides compensation for the forward base-to-emitter volt drop of transistor 50.

The use of a voltage divider circuit common to the bias circuits of the transistors 33 and 50 diminishes the effect of resistor variations on the base bias of transistors 33 and 50. Also since resistors 106 and 107 are connected to points of fixed reference potential, which are slightly offset from each other due to the volt drop across diode 102, the bias is made substantially constant and independent of resistance variations of resistors 106 and 107.

The bias circuit of FIG. 7 also shifts the bias of VDR 47. The graph of FIG. 3B illustrates generally the characteristic curve of VDR 47 for positive biases. If a negative bias is applied to VDR 47, the characteristic curve will lie in the third quadrant of the graph and will be a mirror image of the curve in FIG. 3B. When the control voltage at terminal 21 is the same as the voltage at the junction of resistor 101 and diode 102, the voltage across VDR 47 is zero and its impedance is extremely high. An increase in the control voltage will increase the base voltage of transistor 50 and the voltage at collector 34 of transistor 33 at first slowly then more rapidly as is illustrated in FIG. 3B. Similarly, a decrease in the control voltage will decrease the base voltage of transistor 50 and the voltage at collector 34 of transistor 33 at first slowly and then more rapidly. By establishing the flesh tone of the displayed image at approximately the zero bias of VDR 47, the flesh tone will be more constant over a wider range of control voltage.

While there has been shown and described what is at present considered the preferred embodiments of the invention, it will be obvious to those skilled in the art that various changes and modifications may be made therein without departing from the scope of the invention as defined by the appended claims.

1. Variable phase shift apparatus comprising:
   - transistor means having base, collector, and emitter electrodes;
   - bias means connected to the electrodes of said transistor means for biasing the electrodes of said transistor means at potentials where said transistor means exhibits a substantial reactive coupling between said base electrode and said collector electrode;
   - means connected to said bias means for varying the potential difference between said base electrode and said collector electrode to vary the reactive coupling therebetween;
   - means connected to said base electrode for providing an input signal thereto; and
   - means connected to said collector electrode for receiving an output signal therefrom, the output signal being a reproduction of the input signal with the phase of the output signal with respect to the input signal being controlled by the magnitude of the potential difference between said base electrode and said collector electrode.

2. Variable phase shift apparatus as defined in claim 1 wherein said means for varying the potential difference between said base electrode and said collector electrode includes a second transistor means having a control electrode and an output electrode, means connecting said output electrode of said second transistor means to said collector electrode of said first-named transistor means, and means connected to said control electrode of said second transistor means for varying the potential thereof thereby varying the potential of said output electrode of said second transistor means and of said collector electrode of said first-named transistor means.

3. Variable phase shift apparatus as defined in claim 2 wherein said means connected to said control electrode of said second transistor means includes a nonlinear impedance means connected to said control electrode and means for providing a control voltage connected to said nonlinear impedance means.

4. Variable phase shift apparatus as defined in claim 2 wherein said bias means connected to said base electrode of said first-named transistor means includes a voltage divider circuit, a first resistance means connected from said voltage divider circuit to said base electrode of said first-named transistor means, and a second resistance means connected from said voltage divider circuit to said control electrode of said second transistor means.

5. Variable phase shift apparatus as defined in claim 4 wherein said voltage divider circuit includes a first resistor, a diode, and a second resistor connected in series with a potential source, and said first and second resistance means are connected to opposite sides of said diode.

6. In a color television receiver having a chroma section wherein a chrominance signal is demodulated by synchronous demodulators and in which a reference signal synchronized to a color burst signal is utilized for synchronous demodulation, tint control circuitry for variably shifting the relative phase of the chrominance and reference signals in response to a control voltage comprising:
   - transistor means having base, collector, and emitter electrodes;
   - bias means connected to the electrodes of said transistor means for biasing the electrodes of said transistor means at potentials where said transistor means exhibits a substantial reactive coupling between said base electrode and said collector electrode;
   - means for providing a control voltage connected to said bias means for varying the potential difference between said base electrode and said collector electrode to vary the reactive coupling therebetween in response to a control voltage; and
   - means connected to said base and collector electrodes for coupling one of the chrominance, reference, and color burst signals through the tint control circuitry.

7. Tint control circuitry as defined in claim 6 wherein said means for providing a control voltage includes a second transistor means having a control electrode and an output electrode, means connecting said output electrode of said second transistor means to said collector electrode of said first-named transistor means, and means connected to said control electrode of said second transistor means for varying the potential thereof.

8. Tint control circuitry as defined in claim 7 wherein said means connected to said control electrode of said second transistor means includes a nonlinear impedance means connected to said control electrode.

9. Tint control circuit as defined in claim 8 wherein said means for coupling one of the chrominance, reference, and color burst signals through the tint control circuitry couples the chrominance signal to said base electrode and receives a phase-shifted chrominance signal at said collector electrode.

10. Tint control circuitry as defined in claim 7 wherein said means connected to said control electrode of said second transistor means for varying the potential thereof comprises: means responsive to a radiated signal from a remote transmitter for providing a direct voltage of a polarity responsive to said radiated signal; capacitive means connected to said means responsive to a radiated signal for storing a charge responsive to said direct voltage; field effect transistor means having an output electrode and a gate electrode connected to said capacitive means; and means connecting said output electrode of said field effect transistor means to said control electrode of said second transistor means.

11. Tint control circuitry as defined in claim 10 wherein said means connecting said output electrode of said field effect transistor means to said control electrode of said second transistor means includes a nonlinear impedance means.

12. Tint control circuitry as defined in claim 7 wherein said bias means includes a voltage divider circuit, a first resistor connected between said voltage divider circuit and said base electrode of said first-named transistor means, and a second resistor connected between said voltage divider circuit and said control electrode of said second transistor means.

13. Tint control circuitry as defined in claim 12 wherein said voltage divider circuit includes a third resistor, a diode, and a fourth resistor connected in series with a potential source and said first and second resistors are connected to opposite sides of said diode.

14. A method of phase shifting an electric signal by a variable amount in a transistor circuit comprising the steps of:

biasing a transistor with collector and base potentials such that said transistor exhibits a substantial reactive coupling between the base and collector;

varying the potential difference between the base and collector to vary the reactive coupling therebetween; and applying the electric signal to the base, the electric signal at the collector being phase shifted by an amount determined by the magnitude of the reactive coupling between the base and collector.

15. A method of phase shifting an electric signal by a variable amount as defined in claim 14 wherein the electric signal is a chrominance signal in a color television receiver.

16. A method of phase shifting an electric signal by a variable amount as defined in claim 14 wherein the potential difference between the base and collector is varied by varying the bias potential of the collector.

17. A method of phase shifting an electric signal by a variable amount as defined in claim 16 wherein the bias potential of the collector is varied nonlinearly with respect to the variation of a control voltage.

18. A method of phase shifting an electric signal by a variable amount as defined in claim 17 wherein the electric signal is one of the color burst, reference, and chrominance signals in a color television receiver whereby the relative phase of the chrominance and reference signals is varied.

* * * * *

PO-1050
(5/69)

UNITED STATES PATENT OFFICE
CERTIFICATE OF CORRECTION

Patent No. 3,637,922 Dated January 25, 1972

Inventor(s) Gopal Krishna Srivastava

It is certified that error appears in the above-identified patent and that said Letters Patent are hereby corrected as shown below:

Col. 8, Claim 9, line 1 "Tint control circuit" should read - - "Tint control circuitry" - - .

Signed and sealed this 26th day of September 1972.

(SEAL)
Attest:

EDWARD M.FLETCHER,JR.
Attesting Officer

ROBERT GOTTSCHALK
Commissioner of Patents